US011552693B2

(12) United States Patent
Karjalainen et al.

(10) Patent No.: US 11,552,693 B2
(45) Date of Patent: Jan. 10, 2023

(54) DYNAMIC INTER-BEAM-INTERFERENCE INDICATION, CONFIGURATION AND COMMUNICATION IN WIRELESS NETWORKS

(71) Applicant: Nokia Technologies Oy, Espoo (FI)

(72) Inventors: Juha Pekka Karjalainen, Oulu (FI); Mihai Enescu, Espoo (FI); Timo Koskela, Oulu (FI); Sami-Jukka Hakola, Kempele (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/422,372

(22) PCT Filed: Jan. 30, 2020

(86) PCT No.: PCT/FI2020/050053
§ 371 (c)(1),
(2) Date: Jul. 12, 2021

(87) PCT Pub. No.: WO2020/165494
PCT Pub. Date: Aug. 20, 2020

(65) Prior Publication Data
US 2022/0123815 A1    Apr. 21, 2022

Related U.S. Application Data

(60) Provisional application No. 62/804,430, filed on Feb. 12, 2019.

(51) Int. Cl.
*H04B 7/06* (2006.01)
*H04B 17/309* (2015.01)
(52) U.S. Cl.
CPC ......... *H04B 7/0695* (2013.01); *H04B 7/0626* (2013.01); *H04B 17/309* (2015.01)

(58) Field of Classification Search
CPC ........ H01Q 21/12; H04B 7/06; H04B 7/0695; H04B 17/309; H04B 7/0626; H04B 7/024;
(Continued)

(56) References Cited

U.S. PATENT DOCUMENTS

2018/0269947 A1    9/2018 Levitsky et al.
2019/0037426 A1    1/2019 Yu et al.
(Continued)

FOREIGN PATENT DOCUMENTS

WO    2018/031807 A1    2/2018

OTHER PUBLICATIONS

Office action received for corresponding Indian Patent Application No. 202147037479, dated Mar. 10, 2022, 5 pages.
(Continued)

*Primary Examiner* — Jaison Joseph
(74) *Attorney, Agent, or Firm* — Harness, Dickey & Pierce, P.L.C.

(57) ABSTRACT

A radio network element includes at least one processor and at least one memory including computer program code. The at least one memory and the computer program code are configured to, with the at least one processor, cause the radio network element to: configure a quasi-co-location-type information entry included in a transmission configuration indication state (S604) for a downlink transmission beam between the radio network element and a user equipment based on at least one beam report, the at least one beam report including at least one transmission parameter for the downlink transmission beam, and the quasi-colocation-type information entry being indicative of one or more sources of inter-beam-interference on the downlink transmission beam at the user equipment; and transmit the transmission con-
(Continued)

figuration indication state including the quasi-co-location-type information entry to the user equipment (S606).

17 Claims, 9 Drawing Sheets

(58) Field of Classification Search
CPC ...... H04B 7/0408; H04B 7/08; H04B 17/336; H04B 17/318; H04B 7/0417; H04W 16/28; H04W 24/02; H04W 24/10
See application file for complete search history.

(56) References Cited

U.S. PATENT DOCUMENTS

| | | | | |
|---|---|---|---|---|
| 2019/0281587 | A1* | 9/2019 | Zhang | H04W 72/042 |
| 2020/0022000 | A1* | 1/2020 | Venugopal | H04W 16/28 |
| 2020/0221428 | A1* | 7/2020 | Moon | H04W 72/042 |
| 2020/0314829 | A1* | 10/2020 | Venugopal | H04L 5/001 |
| 2021/0051667 | A1* | 2/2021 | Yang | H04W 36/08 |
| 2021/0067233 | A1* | 3/2021 | Guan | H04B 7/088 |
| 2021/0314954 | A1* | 10/2021 | Miao | H04W 16/28 |

OTHER PUBLICATIONS

"3rd Generation Partnership Project; Technical Specification Group Radio Access Network; NR; Multiplexing and channel coding (Release 15)", 3GPP TS 38.212, V15.3.0, Sep. 2018, pp. 1-99.

"3rd Generation Partnership Project; Technical Specification Group Radio Access Network; NR; Physical layer procedures for data (Release 15)", 3GPP TS 38.214, V15.3.0, Sep. 2018, pp. 1-96.

"3rd Generation Partnership Project; Technical Specification Group Radio Access Network; NR; Physical layer measurements (Release 15)", 3GPP TS 38.215, V15.3.0, Sep. 2018, pp. 1-15.

"WI Proposal on NR MIMO Enhancements", 3GPP TSG RAN Meeting #80, RP-181453, Agenda : 9.1.1, Samsung, Jun. 11-14, 2018, 5 pages.

"3rd Generation Partnership Project; Technical Specification Group Radio Access Network; NR; Physical channels and modulation (Release 15)", 3GPP TS 38.211, V15.3.0, Sep. 2018, pp. 1-96.

"3rd Generation Partnership Project; Technical Specification Group Radio Access Network; NR; Physical layer procedures for control (Release 15)", 3GPP TS 38.213, V15.3.0, Sep. 2018, pp. 1-101.

International Search Report and Written Opinion received for corresponding Patent Cooperation Treaty Application No. PCT/FI2020/050053, dated May 11, 2020, 14 pages.

"Enhancements on Multi-beam Operation", 3GPP TSG RAN WG1 Meeting #AH-1901, R1-1900692, Agenda : 7.2.8.3, Nokia, Jan. 21-25, 2019, 17 pages.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

Extended European Search Report dated Sep. 29, 2022 for European Application No. 20756593.8.

Vivo 'Discussion on Multi-Beam Operation' 3GPP TSG RAN WG1 Ad-Hoc Meeting 1901, Taipei, 2019, R1-1900138, pp. 1-10.

* cited by examiner

DYNAMIC INTER-BEAM-INTERFERENCE INDICATION, CONFIGURATION AND COMMUNICATION IN WIRELESS NETWORKS

RELATED APPLICATION

This application was originally filed as PCT Application No. PCT/FI2020/050053 on Jan. 30, 2020, which claims priority from U.S. Provisional Application No. 62/804,430, filed on Feb. 12, 2019, each of which is incorporated herein by reference in its entirety.

TECHNICAL FIELD

One or more example embodiments relate to wireless communications networks.

BACKGROUND

Fifth generation (5G) wireless communications networks are the next generation of mobile communications networks. Standards for 5G communications networks are currently being developed by the Third Generation Partnership Project (3GPP). These standards are known as 3GPP New Radio (NR) standards.

SUMMARY

One or more example embodiments provide an inter-beam-interference (IBI) and/or interference indication mechanism that may improve performance of simultaneous downlink multi-beam and multi-transmission and reception point (TRP) transmission for user equipment (UEs) equipped with multiple antennas and/or antenna panels by enhancing IBI and/or interference awareness at the UE with IBI indication information. The IBI and/or interference may be inter-cell or intra-cell IBI and/or interference. IBI and/or interference awareness at the gNB may also be provided by enabling support for IBI and/or interference determination based on, for example, L1-Signal-to-Interference and Noise Ratio (SINR) metrics. In one example, IBI and/or interference awareness may enable more efficient scheduling of simultaneous multi-beam and multi-TRP transmissions thereby improving performance.

One or more example embodiments may relate to a 3GPP NR physical layer design for multiple-input-multiple-output (MIMO) enhancements in 3GPP NR Release 16 (Rel-16) and onwards.

At least one example embodiment provides a radio network element comprising at least one processor and at least one memory including computer program code. The at least one memory and the computer program code are configured to, with the at least one processor, cause the radio network element to: configure a quasi-co-location-type information entry included in a transmission configuration indication state for a downlink transmission beam between the radio network element and a user equipment based on at least one beam report, the at least one beam report including at least one transmission parameter for the downlink transmission beam, and the quasi-co-location-type information entry being indicative of one or more sources of inter-beam-interference on the downlink transmission beam at the user equipment; and transmit the transmission configuration indication state including the quasi-co-location-type information entry to the user equipment.

At least one example embodiment provides a radio network element comprising: means for configuring a quasi-co-location-type information entry included in a transmission configuration indication state for a downlink transmission beam between the radio network element and a user equipment based on at least one beam report, the at least one beam report including at least one transmission parameter for the downlink transmission beam, and the quasi-co-location-type information entry being indicative of one or more sources of inter-beam-interference on the downlink transmission beam at the user equipment; and means for transmitting the transmission configuration indication state including the quasi-co-location-type information entry to the user equipment.

At least one other example embodiment provides a method of operating a radio network element, the method comprising: configuring a quasi-co-location-type information entry included in a transmission configuration indication state for a downlink transmission beam between the radio network element and a user equipment based on at least one beam report, the at least one beam report including at least one transmission parameter for the downlink transmission beam, and the quasi-co-location-type information entry being indicative of one or more sources of inter-beam-interference on the downlink transmission beam at the user equipment; and transmitting the transmission configuration indication state including the quasi-co-location-type information entry to the user equipment.

At least one other example embodiment provides a non-transitory computer-readable storage medium including computer-executable instructions that, when executed at a radio network element, cause the radio network element to perform a method of operating a radio network element, the method comprising: configuring a quasi-co-location-type information entry included in a transmission configuration indication state for a downlink transmission beam between the radio network element and a user equipment based on at least one beam report, the at least one beam report including at least one transmission parameter for the downlink transmission beam, and the quasi-co-location-type information entry being indicative of one or more sources of inter-beam-interference on the downlink transmission beam at the user equipment; and transmitting the transmission configuration indication state including the quasi-co-location-type information entry to the user equipment.

According to at least some example embodiments, the at least one memory and the computer program code are configured to, with the at least one processor, cause the radio network element to configure interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

According to at least some example embodiments, the radio network element may further include means for configuring interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

The interference resource indicator information may include a second element indicating whether the interference resource indicator information is active or inactive for the downlink transmission beam.

The quasi-co-location-type information entry may identify at least one of an antenna panel at the user equipment or at least one interference resource with respect to the downlink transmission beam.

The one or more sources of inter-beam-interference include at least one of zero-power Channel State Information Interference Measurement, non-zero-power Channel State Information Reference Signal, a Synchronization Signal Block index, Demodulation Reference Signals, Phase Tracking Reference Signals or mobility Channel State Information Resource Signal resources.

The quasi-co-location-type information entry may be indicative of an inter-beam-interference relationship between a target signal and a reference signal at the user equipment.

The inter-beam-interference may include at least one of intra-cell-inter-beam-interference or inter-cell-inter-beam-interference.

The at least one transmission parameter may include at least one of a Reference Signal Received Power Value, a Channel State Information Resource Indicator, a Synchronization Signal Block index, Signal-to-Interference and Noise Ratio values, a Reference Signal Received Power Value associated with interference resources, or a group ID associated with antenna panels at the user equipment.

The at least one memory and the computer program code may be configured to, with the at least one processor, cause the radio network element to configure interference panel indicator information associated with the quasi-co-location-type information entry, the interference panel indicator information including at least a first element indicating whether to utilize the antenna panel at the user equipment.

The radio network element may further include means for configuring interference panel indicator information associated with the quasi-co-location-type information entry, the interference panel indicator information including at least a first element indicating whether to utilize the antenna panel at the user equipment.

The interference panel indicator information may include a second element indicating whether the interference panel indicator information is active or inactive for the downlink transmission beam.

At least one other example embodiment provides a user equipment comprising at least one antenna; at least one processor; and at least one memory including computer program code. The at least one memory and the computer program code are configured to, with the at least one processor, cause the user equipment to: determine at least one of a downlink advanced receiver or spatial filter for the at least one antenna based on a quasi-co-location-type information entry included in a transmission configuration indication state received at the user equipment, the quasi-co-location-type information entry configured based on at least one beam report from the user equipment, the at least one beam report including at least one transmission parameter for a downlink transmission beam between a radio network element and the user equipment, and the quasi-co-location-type information entry being indicative of one or more sources of inter-beam-interference on the downlink transmission beam at the user equipment.

At least one other example embodiment provides a user equipment comprising means for determining at least one of a downlink advanced receiver or spatial filter for the at least one antenna based on a quasi-co-location-type information entry included in a transmission configuration indication state received at the user equipment, the quasi-co-location-type information entry configured based on at least one beam report from the user equipment, the at least one beam report including at least one transmission parameter for a downlink transmission beam between a radio network element and the user equipment, and the quasi-co-location-type information entry being indicative of one or more sources of inter-beam-interference on the downlink transmission beam at the user equipment.

At least one other example embodiment provides a method for configuring a user equipment including at least one antenna for wireless communication, the method comprising: determining at least one of a downlink advanced receiver or spatial filter for the at least one antenna based on a quasi-co-location-type information entry included in a transmission configuration indication state received at the user equipment, the quasi-co-location-type information entry configured based on at least one beam report generated at the user equipment, the at least one beam report including at least one transmission parameter for a downlink transmission beam between a radio network element and the user equipment, and the quasi-co-location-type information entry being indicative of one or more sources of inter-beam-interference on the downlink transmission beam at the user equipment.

At least one other example embodiment provides a non-transitory computer-readable storage medium including computer-executable instructions that, when executed at user equipment, cause the user equipment to perform a method for configuring the user equipment including at least one antenna for wireless communication, the method comprising: determining at least one of a downlink advanced receiver or spatial filter for the at least one antenna based on a quasi-co-location-type information entry included in a transmission configuration indication state received at the user equipment, the quasi-co-location-type information entry configured based on at least one beam report generated at the user equipment, the at least one beam report including at least one transmission parameter for a downlink transmission beam between a radio network element and the user equipment, and the quasi-co-location-type information entry being indicative of one or more sources of inter-beam-interference on the downlink transmission beam at the user equipment.

According to at least some example embodiments, the at least one antenna may include one or more antenna panels or antenna elements.

The at least one memory and the computer program code may be configured to, with the at least one processor, cause the user equipment to determine the at least one of a downlink advanced receiver or spatial filter for the at least one antenna based on the quasi-co-location-type information entry and interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

The user equipment may further include means for determining the at least one of a downlink advanced receiver or spatial filter for the at least one antenna based on the quasi-co-location-type information entry and interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

The interference resource indicator information may include a second element indicating whether the interference resource indicator information is active or inactive for the downlink transmission beam.

The quasi-co-location-type information entry may identify at least one of an antenna panel at the user equipment or at least one interference resource with respect to the downlink transmission beam.

The one or more sources of inter-beam-interference may include at least one of zero-power Channel State Information Interference Measurement, non-zero-power Channel State Information Reference Signal, Synchronization Signal Block index, Demodulation Reference Signals, Phase Tracking Reference Signals or mobility Channel State Information Resource Signal resources.

The quasi-co-location-type information entry may be indicative of an inter-beam-interference relationship between a target signal and a reference signal at the user equipment.

The inter-beam-interference may include intra-cell-inter-beam-interference or inter-cell-inter-beam-interference.

The at least one transmission parameter may include at least one of a Reference Signal Received Power value, a Channel State Information Resource Indicator, Synchronization Signal Block indices, Signal-to-Interference and Noise Ratio values, Reference Signal Received Power value associated with interference resources, or a group ID associated with antenna panels at the user equipment. The at least one memory and the computer program code may be configured to, with the at least one processor, cause the user equipment to transmit the at least one beam report to the radio network element.

The user equipment may further include means for transmitting the at least one beam report to the radio network element.

The at least one memory and the computer program code may be configured to, with the at least one processor, cause the user equipment to receive downlink transmissions from the radio network element by utilizing the at least one of the downlink advanced receiver or spatial filter for the at least one antenna.

The user equipment may further include means for receiving downlink transmissions from the radio network element by utilizing the at least one of the downlink advanced receiver or spatial filter for the at least one antenna.

The at least one memory and the computer program code may be configured to, with the at least one processor, cause the user equipment to determine whether to utilize the antenna panel based on interference panel indicator information, the interference panel indicator information entry including at least a first element indicating whether to utilize the antenna panel for the downlink transmission beam at the user equipment.

The user equipment may further include means for determining whether to utilize the antenna panel based on interference panel indicator information, the interference panel indicator information entry including at least a first element indicating whether to utilize the antenna panel for the downlink transmission beam at the user equipment.

The interference panel indicator information may include a second element indicating whether the interference panel indicator information is active or inactive for the downlink transmission beam.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

It will be appreciated that a number of example embodiments may be used in combination.

Figure 1:
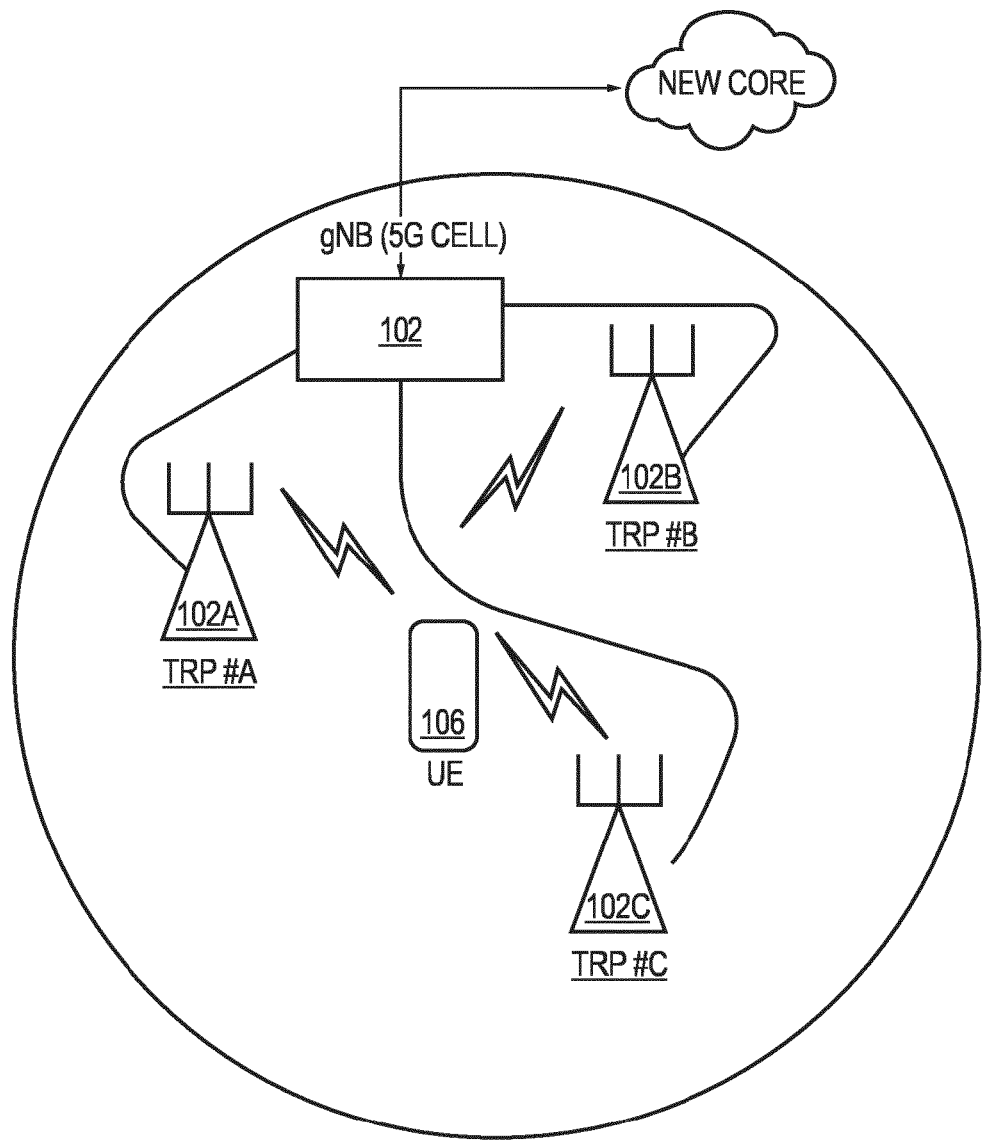
FIG. 1 illustrates a simplified diagram of a portion of a 3rd Generation Partnership Project (3GPP) New Radio (NR) access deployment for explaining example embodiments.

FIG. 1 illustrates a simplified diagram of a portion of a 3rd Generation Partnership Project (3GPP) New Radio (NR) access deployment for explaining example embodiments.

Referring to FIG. 1, the 3GPP NR radio access deployment includes a gNB 102 having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for user equipment (UEs) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 1, the TRPs 102A, 102B, 102C are configured to communicate with a UE (e.g., UE 106) via one or more transmit (TX)/receive (RX) beam pairs. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C.

Although only a single UE 106 is shown in FIG. 1, the gNB 102 and TRPs 102A, 102B, 102C may provide communication services to a relatively large number of UEs within the coverage area of the TRPs 102A, 102B, 102C. For the sake of clarity of example embodiments, communication services (including transmitting and receiving wireless signals) will be discussed as between the gNB 102 and the UE 106. It should be understood, however, that signals may be transmitted between the UE 106 and one or more of the TRPs 102A, 102B, 102C.

The 3GPP NR Release 15 (Rel-15) standard specifies a beam identification and reporting mechanism in which a UE provides beam reports to the network (e.g., a gNB). This beam indication and reporting mechanism supports identification of downlink (DL) Channel State Information (CSI) resources associated with transmit and receive beams at the UE based on received signal strength (Reference Signal Received Powers (RSRPs)) at the UE. More specifically, for example, the 3GPP NR Rel-15 L1 and L2 specifications provide support for UE beam reporting to the network with and without beam grouping based on configured downlink CSI resources such as synchronization signal block (SSB) or non-zero-power CSI reference signal (NZP-CSI-RS) resources. The beam reports from the UE include up to four CSI-RS resource indicators (CRIs) or SSB indices and associated L1-RSRP values for the transmit and receive beam pairs. The UE may provide beam reports to the network periodically via the Physical Uplink Control Channel (PUCCH), semi-persistently via the PUCCH or the Physical Uplink Shared Channel (PUSCH) or aperiodically on the PUSCH. To reduce signaling overhead, differential based L1-RSRP reporting with respect to the maximum L1-RSRP value is also supported when the number of configured CRIs or SSBs reported is larger than one. In this case, the beam report includes the measured L1-RSRP for the strongest beam and the difference between the measured L1-RSRP for the strongest beam and the measured L1-RSRP for the other beams.

Without beam reporting, the 3GPP NR Rel-15 standard supports a UE downlink receive beam training procedure with configured downlink transmit beams associated with NZP-CSI-RS resources within a resource set transmitted in the same spatial direction.

Figure 2:
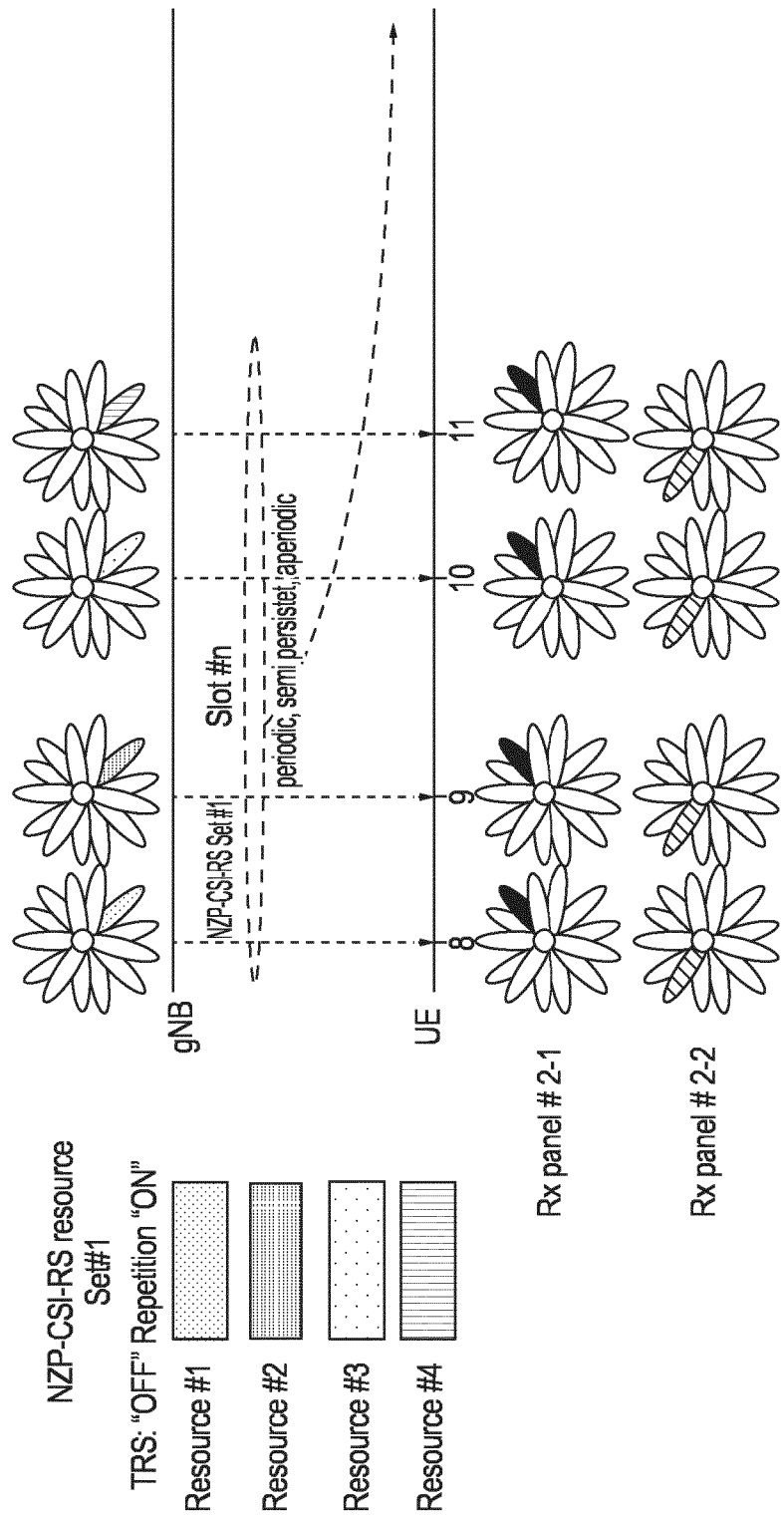
FIG. 2 illustrates an example 3GPP NR Release 15 (Rel-15) user equipment (UE) receive beam training procedure.

FIG. 2 illustrates an example UE downlink receive beam training procedure for antenna panels 2-1 and 2-2 at a UE without beam reporting according to the 3GPP NR Rel-15 standard. In this example, the gNB may configure the UE with a higher layer parameter CSI-ResourceConfig for channel measurement to include a NZP-CSI-RS-ResourceSet that is configured with the higher layer parameter repetition and without the higher layer parameter trs-Info. This defines the CSI report configuration of the UE and its related CSI measurement configuration. Here, higher parameter repetition means that each of the resources of NZP-CSI-RS resource Set #1 are defined to be transmitted in the same transmit (TX) spatial direction; as shown in FIG. 2, the direction of the transmit beams of the gNB is the same over consecutive symbol time instants (e.g., 8, 9, 10, 11 in FIG. 2). Configuring the NZP-CSI-RS-ResourceSet without higher layer parameter trs-info means that resources of NZP-CSI-RS resource Set #1 are not used for time- and frequency-tracking purposes at the UE.

In the example shown in FIG. 2, the UE may only be configured with the same number of antenna ports (1 or 2) as the higher layer parameter NrofPorts for all CSI-RS resources within the set. When only a single NZP-CSI-RS set with periodic, semi-persistent or aperiodic resources is configured, then the UE is not assumed to provide any beam report.

Referring to FIG. 2, periodic, semi-persistent or aperiodic NZP-CSI-RS resources are transmitted on configured antenna ports, and the UE is assumed to perform the training of different downlink receive beams associated with antenna panels 2-1 and 2-2 based on these transmitted resources in a transparent way for the gNB.

In access deployments such as that shown in FIG. 1, simultaneous downlink multi-beam transmission over multiple antenna panels and/or multiple TRPs in frequency range 1 (FR1) (below 6 GHz) or frequency range (FR2) (above 6 GHz), may cause potential inter-beam-interference (IBI) scenarios at the UE. The IBI may be inter-cell-IBI or intra-cell-IBI.

A UE may experience inter-beam-interference (IBI) as a result of Single TRP multi-beam transmissions or Multi-TRP single/multi-beam transmissions.

Single TRP transmissions involve multi-beam transmissions for a single UE or multi-beam transmissions for multiple UEs. In the case of multi-beam transmissions for a single UE, the impact of IBI at the UE depends on the properties of simultaneously scheduled transmit beams for the UE, the number of scheduled transmit beams, the propagation environment, etc.

In the case of multi-beam transmissions for multiple UEs, the impact of IBI at the UE depends on properties of simultaneously scheduled transmit beams for multiple UEs, the total number of scheduled transmit beams for the UEs, the propagation environment, etc.

Multi-TRP single/multi-beam transmissions involve single- or multi-beam transmissions from a serving TRP to one or more UEs in the presence of interfering TRPs. In this case, the impact of IBI at the UE depends on the properties of simultaneously scheduled transmit beams scheduled from multiple TRPs (serving and interfering), the total number of scheduled transmit beams from multiple TRPs (serving and interfering), the propagation environment, etc.

The 3GPP NR Rel-15 standard supports CSI-IM and NZP-CSI-RS as interference measurement resource configurations to account for interference. For carrier frequencies above 6 GHz, resources for channel and interference measurements are spatially quasi-co-located (QLC'd) with each other. Because the resources are QCL'd, the receiver (e.g., UE 106) may assume that the channels for the resources share at least some of the same parameters/characteristics, such as Doppler spread/shift, average delay, spatial receive (RX) parameters, etc.

CSI-IM is a flexibly configured resource for periodic, semi-persistent or aperiodic interference measurements for channels. A CSI-RS (e.g., zero-power (ZP)-CSI-RS or non-zero-power (NZP)-CSI-RS) resource set supports resources with the following two resource element (RE) measurement patterns and may include one or more CSI-IM resources for interference measurement.

(2,2):
  Sub-carrier locations: {0, 2, 4, 6, 8, 10}
  Symbol positions: {0, . . . , 12}
(4,1):
  Sub-carrier locations: {0, 4, 8}
  Symbol positions: {0, . . . , 13}

Figure 3:
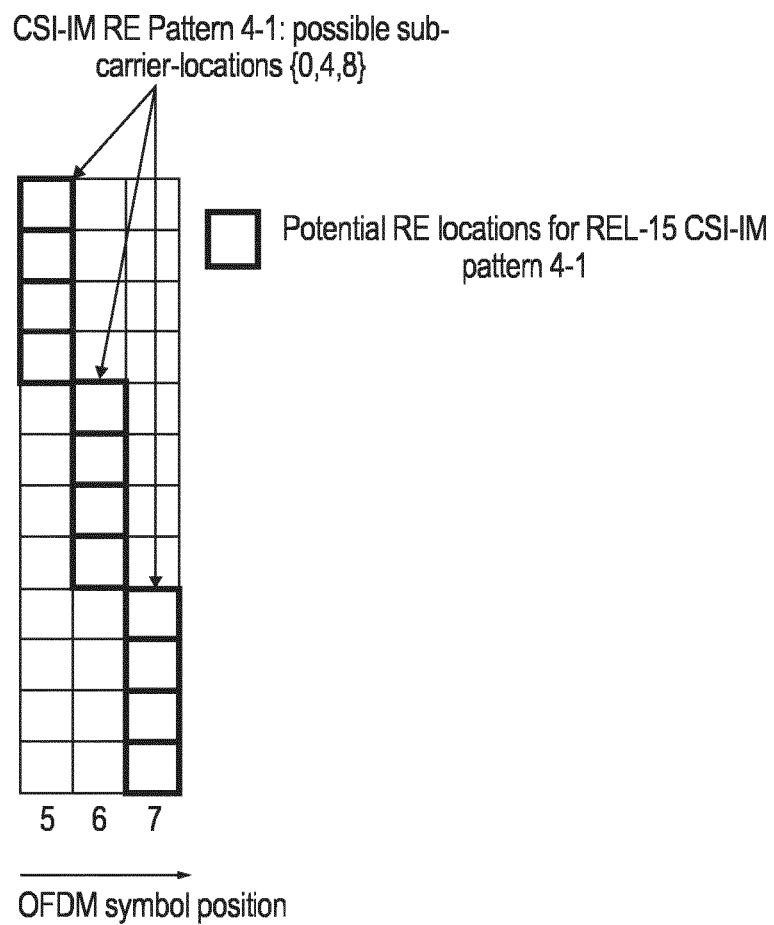
FIG. 3 illustrates an example 3GPP NR Rel-15 zero-power (ZP) Channel State Information-Interference Measurement (CSI-IM) resource (RE) pattern.

FIG. 3 illustrates an example of CSI-IM based on a ZP-CSI-RS RE pattern (4,1). As shown in FIG. 3, the ZP-CSI-IM RE pattern (4,1) includes possible subcarrier locations {0, 4, 8}.

For NZP-CSI-RS (also referred to as CSI-RS), the UE assumes that each configured antenna port corresponds to an interference layer.

As mentioned above, the 3GPP NR Rel-15 standard specifies a beam identification and reporting mechanism in which a UE provides beam reports to the gNB. More generally, the beam identification and reporting mechanism is part of a beam management mechanism in the 3GPP NR Rel-15 standard, wherein the beam management mechanism includes (i) Beam Indication, (ii) Beam Measurements and Reporting, (iii) Beam Tracking and Refinement and (iv) Beam Recovery.

Beam Indication assists the UE in setting a receive beam for proper reception from the gNB (e.g., via a TRP) on the downlink, and setting a transmit beam for transmission to the gNB on the uplink. In more detail, for example, Beam Indication is a process in which the gNB indicates a downlink transmit beam to the UE, how to set the UE's receive beam for downlink transmissions from the gNB, and how to set the UE's transmit beam for uplink transmissions to the gNB. Beam Indication utilizes Transmission Configuration Indicator (or Indication) (TCI) states for resources associated with given beams. A TCI state for a given resource may indicate a QCL relationship with one or more other resources. In the 3GPP NR Rel-15 standard, the TCI state definition for a given resource includes the following four different types of QCL parameters characterizing this QCL relationship:

QCL type A: Doppler shift, Doppler spread, average delay, delay spread;

QCL type B: Doppler shift, Doppler spread;
QCL type C: average delay, Doppler shift; and
QCL type D: Spatial RX.

As discussed herein, a TCI state may be described as being associated with, or for, a given beam, rather than for a given resource.

Beam Measurements and Reporting as well as Beam Tracking and Refinement provide means for the gNB to determine and control Beam Indication for uplink and downlink signals and channels.

More specifically, Beam Measurements and Reporting include procedures for the UE to provide the gNB with knowledge about feasible transmit beams for the UE. Typically, downlink RS (e.g., SS/Physical Broadcast Channel (PBCH) blocks) and/or NZP-CSI-RS resources are used to sound gNB transmit (TX) beams. The UE measures parameters/characteristics for the downlink channels based on the downlink RS, and provides RSRP type measurements (e.g., measured L1-RSRP) to the gNB in a beam report.

Based on transmit/receive beam correspondence assumptions, the gNB determines feasible beams for uplink and downlink transmissions (or channels) between the gNB and the UE based on the beam report(s).

The UE may also be configured with uplink sounding reference signal (SRS) resources to separately identify uplink beams where the UE transmits SRS resources using different transmit beams. The gNB measures parameters/characteristics of the SRS, and determines which transmit beam(s) is/are feasible to be used based on the measurements.

Beam Tracking and Refinement includes a set of procedures to refine beams at the gNB and UE. Both uplink and downlink RS may be used to refine the beams between the gNB and the UE at both ends. For example, in refining beams at the gNB based on downlink RS, the gNB may transmit multiple NZP-CSI-RS resources corresponding to different transmit beams while the UE uses a fixed receive beam and indicates resources (e.g., NZP-CSI-RS and/or SSB) associated with transmit beams that the UE considers to be the best transmit beam. Similarly, in refining beams at the UE, the gNB may transmit multiple NZP-CSI-RS resources using the same fixed transmit beam while the UE tries different receive beams to identify the best receive beam for the given transmit beam associated with the resources (e.g., NZP-CSI-RS and/or SSB).

Beam Recovery provides for rapid link reconfiguration against sudden blockages; that is, for example, relatively fast re-aligning of gNB and UE beams if blockage occurs on in-service transmit/receive beam pair link(s) between the gNB and UE.

Especially at higher carrier frequencies (e.g., above 6 GHz), UEs are typically equipped with one or multiple antenna arrays or antenna modules per digital input, and both transmission and reception beam patterns per digital input are narrower than an omni-directional beam pattern typically used at carrier frequencies below 6 GHz. Depending on the signal or channel in question, a certain beam indication mechanism on the downlink from gNB to UE may be defined as described below.

For the Physical Downlink Control CHannel (PDCCH), by Radio Resource Control (RRC) signaling, the UE may be configured with up to 64 candidate TCI states for a control resource set (CORESET), wherein each candidate TCI state may have one RS to provide a spatial domain parameter to characterize the transmit beam and the corresponding receive beam at the UE. The RS may be a SS/PBCH block or a NZP-CSI-RS (used for beam management or time-frequency tracking). The CORESET defines time and frequency resources in which the UE searches PDCCH candidates from among PDCCH transmissions using different aggregation levels (ALs) by trying different ALs. One TCI state per CORESET is active at a time, and the gNB transmits a Media Access Control (MAC) control element (CE) activation command to activate a certain TCI state. A UE may configure up to three CORESETs, wherein CORESET 0 is used for scheduling both broadcast and unicast traffic to the UE. Separate spatial domain parameter configuration and activation signaling are provided for each CORESET.

For the Physical Downlink Shared CHannel (PDSCH), by RRC signaling, the UE may be configured for up to 64 candidate TCI states, wherein each TCI state may have one RS to provide a spatial domain parameter characterizing the transmit beam and the corresponding receive beam at the UE. The MAC CE activation command is used to select up to eight TCI states that may be dynamically indicated in the Downlink Control Information (DCI) included in the scheduling assignment for scheduling PDSCH transmissions by the UE.

For a periodic NZP-CSI-RS resource/resources set, the gNB configures, by RRC signaling, a reference to one of the candidate TCI states, which provides QCL parameters to be applied when receiving the CSI-RS.

For a semi-persistent NZP-CSI-RS resource/resource set, the MAC CE that activates the configured NZP-CSI-RS resource provides an index of a candidate TCI state that provides QCL parameters to be applied when receiving the semi-persistent NZP-CSI-RS resource. The source for the target semi-persistent NZP-CSI-RS resource set is provided in a list of TCI_State_IDs in the same MAC CE that activates the semi-persistent NZP-CSI-RS resource set.

With regard to an aperiodic NZP-CSI-RS resource/resource set, for each aperiodic NZP-CSI-RS resource in a NZP-CSI-RS resource set associated with each CSI triggering state, an index to a candidate TCI state is provided to indicate the source RS in the spatial QCL sense.

For the PUCCH, the UE may be configured, by RRC signaling, with up to 8 reference RS (Spatial Relation Information) for each PUCCH resource. In one example, a reference RS may be a downlink SS/PBCH index, NZP-CSI-RS resource index or an SRS resource index. In a case of more than one configured reference RS for the PUCCH resource, a MAC CE activation command may be used to select one of the reference RS to be applied at a time. The UE determines the transmit beam for the PUCCH based on the activated reference RS. The maximum number of PUCCH resources in the first PUCCH resource set is 32 and the maximum number of PUCCH resources in the other sets of PUCCH resources is 8. Each PUCCH resource set corresponds to a certain range of Uplink Control Information (UCI) bits, whereas PUCCH resources within a resource set provide resource allocation flexibility as if having resource specific frequency hopping parameters, PUCCH format (from format 0 to format 4), starting symbol, duration in number of symbols, cyclic shift parameter, OCC index, OCC length, or the like.

For periodic SRS (P-SRS), the gNB may configure, by RRC signaling, a reference RS for the P-SRS resource. The P-SRS resource may be a SS/PBCH block, periodic NZP-CSI-RS (P-CSI-RS), semi-persistent NZP-CSI-RS (SP-CSI-RS) or P-SRS.

For semi-persistent SRS (SP-SRS), the gNB may configure, by RRC signaling, a reference RS for the SP-SRS resource. The SP-SRS resource may be SS/PBCH block, P-CSI-RS, SP-CSI-RS, P-SRS, SP-SRS. A SP-SRS activation command for a SRS resource set at the MAC layer may override RRC configured spatial information and may provide a list of source RS with one per SRS resource. A source RS may be a SS/PBCH block, P-CSI-RS, SP-CSI-RS, P-SRS or SP-SRS.

For aperiodic SRS (AP-SRS), the gNB may configure, by RRC signaling, a reference RS for the AP-SRS resource. The AP-SRS resource may be a SS/PBCH block, P-CSI-RS, SP-CSI-RS, P-SRS, SP-SRS, AP-SRS, or aperiodic CSI-RS (AP-CSI-RS). DCI-signaling based triggering of SRS resource set may be applied for triggering the transmission.

Figure 4:
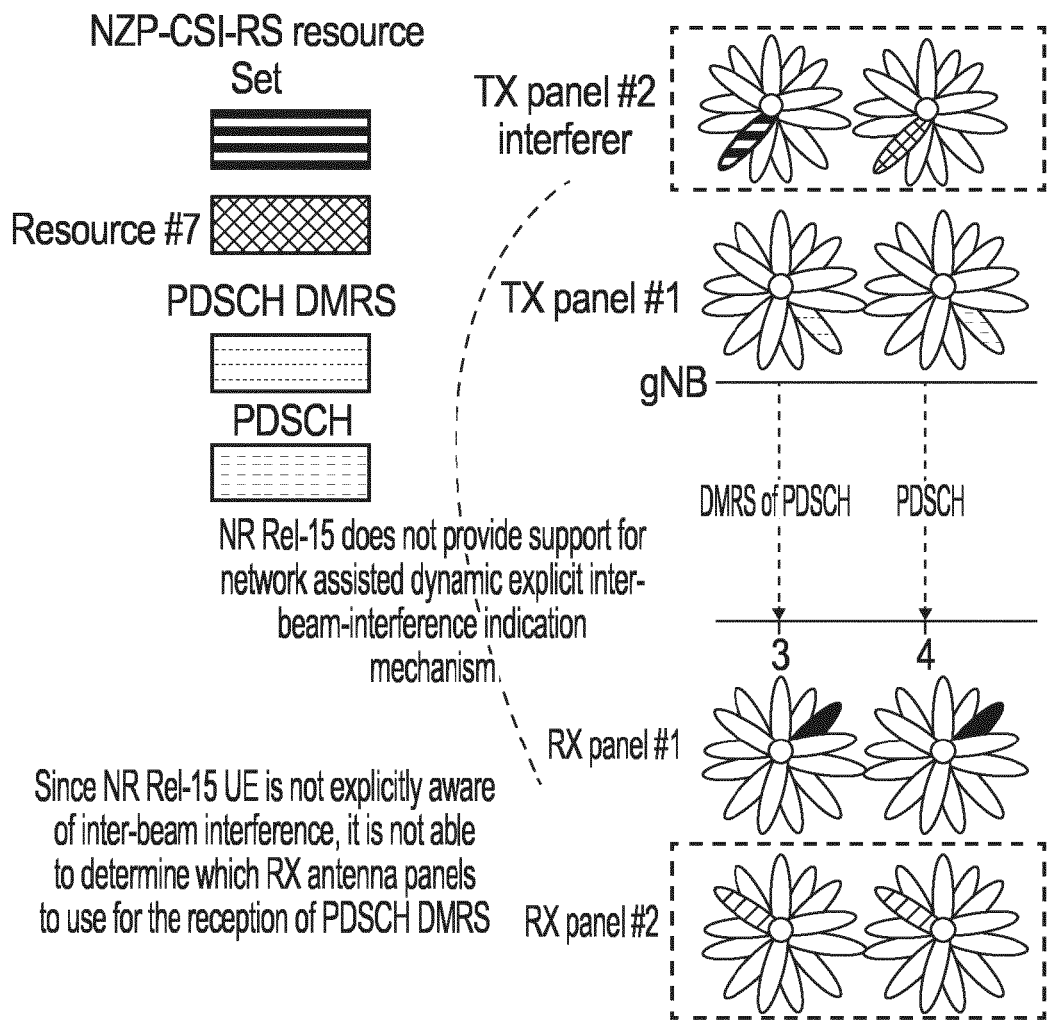
FIG. 4 illustrates an example of 3GPP NR Rel-15 based downlink Physical Downlink Shared CHannel (PDSCH) DeModulation Reference Signal (DMRS) and PDSCH transmission and reception with transmit and receive beams

FIG. 4 illustrates an example of 3GPP NR Rel-15 based downlink PDSCH DeModulation Reference Signal (DMRS) and PDSCH transmission and reception with transmit and receive beams.

Referring to the example shown in FIG. 4, two downlink transmit beams are simultaneously transmitted from two different antenna panels at the gNB. One transmit beam is associated with PDSCH DRMS and PDSCH and another transmit beam is associated with NZP-CSI-RS resource IDs #6 and #7, respectively, within a resource set.

Due to simultaneous transmission of NZP-CSI-RS and PDSCH DMRS/PDSCH, IBI occurs at the receive beam at the UE determined for PDSCH DMRS and PDSCH reception. Since the UE in this example is not explicitly aware of interfering beams and corresponding resources, the UE is not able to determine which receive antenna panels to activate and/or deactivate for the simultaneous reception of PDSCH DMRS and/or to improve the performance of the advanced receiver at the UE 106 with CSI related to interferers.

It would be beneficial for system performance in terms of, for example, enhanced performance and/or scheduling flexibility of a network, if the network could provide assistance information dynamically on explicit intra- and/or inter-cell IBI. However, the current 3GPP NR Rel-15 specification does not provide support for a network assisted dynamic explicit IBI indication mechanism.

To further enhance performance of the PDCCH and/or PDSCH, it may be beneficial for UEs to be aware of active interfering transmit beams associated with resources (from its own (intra-) or neighboring (inter-) cells). As a result of this IBI/interference information, the UE may determine its receive spatial filter and/or advanced receiver (e.g., minimum mean square error interference rejection combining (MMSE-IRC) or maximum likelihood (ML) based detector or maximum a posteriori (MAP) based detector or interference cancellation receiver). However, currently, 3GPP NR Rel-15 does not provide any support for dynamic/static intra-cell or inter-cell IBI indication for UEs.

One or more example embodiments provide an IBI/interference aware downlink transmit beam indication framework for at least NZP-CSI-RS measurements and reception of channels and transmissions on channels (e.g., PDCCH and/or PDSCH) associated with DMRS, which may lead to more efficient scheduling and/or improved system performance.

In at least one example embodiment, a beam specific intra- and inter-cell-IBI/interference indication mechanism is provided to facilitate improved interference aware data transmission and measurements thereby resulting in an IBI/interference aware receiver at the UE, for example. This includes, for example, a RS (e.g., DMRS, NZP-CSI-RS, etc.) resource CORESET and PDSCH transmit beam specific intra- and inter-cell IBI/interference indication mechanism framework.

The intra- and inter-cell IBI/interference indication mechanism framework defines an additional QCL parameter that enables a network to assist the UE in activating and/or deactivating UE receive antenna panels for simultaneous interference mitigation over activated antenna panels according to interference information. The number of UE receive antenna panels capable of simultaneous reception depends on the capability of the UE.

Furthermore, the additional QCL parameter may assist the UE in determining its spatial filter and/or advanced receiver (e.g., MMSE-IRC, ML or MAP or successive/parallel interference cancellation based) according to dynamically indicated intra- and/or inter-cell IBI/interference information (also referred to as interference information).

For example, the UE may compute (e.g., explicitly) an estimate of an interference covariance matrix according to IBI/interference information (e.g., from the gNB) for the use of an advanced receiver. In another example, the UE may use indicated resources (e.g., from the gNB) associated with interference to define dominant intra-cell or inter-cell interferers for interference cancellation at the UE's advanced receiver.

The new QCL parameter may include, identify or convey IBI/interference information describing the source of spatial intra- and/or inter-cell IBI at the UE. A mechanism (e.g., interference resource indicator information) for the gNB to dynamically identify and indicate intra- or inter-cell IBI situations (e.g., interfering resources) for the UE when the transmit beam associated with the PDCCH, PDSCH, NZP-CSI-RS, etc. changes may also be provided.

According to one or more example embodiments, when beam-based transmission is not used in a system, the new QCL parameter may define source(s) of spatial intra- and/or inter-cell interference resource(s) at the UE.

The IBI indication mechanism may be beam-specific.

By utilizing an intra- or inter-cell-IBI aware receiver for the reception of a target RS (e.g., CSI-RS, DMRS of PDCCH, DMRS of PDSCH, etc.), the UE may determine an advanced receiver in the spatial domain and/or a spatial filter for one or more antennas or antenna panels by taking into account the interference resource information, interference resource indicator information, interference panel information and/or interference panel indicator information for a given beam thereby improving reception performance of the PDSCH and/or PDCCH at the UE and/or improving overall system performance.

The new QCL parameter may be characterized as defining an IBI relationship between target RS and reference RS at the UE.

The new QCL parameter may be in the form of a new QCL-type entry ('QCL-TypeE') in a TCI state definition associated with a given transmit and/or receive beam for the UE. The gNB may configure the new QCL parameter by higher layer signaling between RS (e.g., NZP-CSI-RS and/or SSB) and DMRS ports of the PDSCH or PDCCH or antenna ports of NZP-CSI-RS based on beam reports from the UE. The beam reports may include L1-RSRP, CRI and/or SSB indices, L1-SINR values and/or group ID associated with UE antenna panels. The QCL-TypeE parameter may include, convey or identify interference information, which may include at least one of interference resource information (TCI #m_interference_info or TCI #m_interference_info_panel_id #n) or interference panel information (TCI #m_interference_panel_info). As discussed herein, new QCL parameter, additional QCL parameter and QCL-TypeE parameter may be used interchangeably.

In accordance with one or more example embodiments, the QCL-TypeE parameter may be included as a QCL-type 3 entry in a TCI state definition for a beam. The QCL-type 3 entry may be dedicated for the QCL-TypeE parameter.

The interference resource information may include actual IBI resources and/or resource sets (e.g., ZP-CSI-IM, NZP-CSI-RS, SSB index, Mobility CSI-RS, etc.) for the beam associated with the TCI state. Interference resource indicator information may indicate whether the interference resource information (as a whole or with regard to respective interfering resources) and/or interference resource indicator information itself should be considered when determining the receive spatial filter and/or advanced receiver at the UE. The interference resource information may include intra- and/or inter-cell IBI/interference information and may be dynamically adjustable via the interference resource indicator information.

The interference panel information may include actual UE receive antenna panel identifiers (IDs) used for reception of the transmit beam associated with the TCI state. Interference panel indicator information may indicate whether the interference panel information and/or the interference panel indicator information should be considered and/or whether the UE should utilize respective antenna panels for downlink receive beams.

If a UE is in connected mode, then the UE may use the interference panel indicator information along with the interference panel information in the QCL-TypeE parameter to activate and/or deactivate receive antenna panels at the UE for simultaneous interference mitigation over activated antenna panels. Furthermore, the interference resource information in the QCL-TypeE parameter may assist UE in determining one or more spatial filters associated with UE receive antenna panels and/or to improve the performance of UE advanced receiver with CSI of interferers obtained from the active interference resources identified in the interference resource information, and then receive the PDCCH with the related DMRS and/or the PDSCH with related DMRS or NZP-CSI-RS using the intra- and/or inter-cell IBI aware receiver.

As discussed herein, the TCI-state specific interference resource indicator information (TCI #m_interference_indicator) and/or interference panel indicator information (TCI #m_interference_panel_indicator) may be referred to as interference indicator information.

The interference resource indicator information (also sometimes referred to herein as an interference resource bit vector, an IBI resource information vector, or an IBI/interference resource information vector) may be a bit vector including K elements, where K is an integer. Of the K elements, the first through (K−1) elements of the interference resource indicator information are associated with interference measurement resources indicating whether a respective interfering resource is active with regard to the associated interfering resource or downlink transmit beam. These (K−1) elements of the interference resource indicator information are associated with actual interference resources (e.g., ZP-CSI-IM, NZP-CSI-RS, SSB index, Mobility CSI-RS, etc.) for the beam associated with the TCI state. Accordingly, the elements of the interference resource indicator information are associated with related identifiers (IDs) of interference resources. Cell-ID information associated with interference measurement resources is encapsulated into the resource configuration itself. The K-th element indicates whether the entire interference resource indicator information is active or inactive (e.g., whether the UE should take the interference resource information and/or the interference resource indicator information into account when determining the receive spatial filter and/or advanced receiver at the UE).

The interference panel indicator information (also sometimes referred to herein as an interference panel bit vector, an IBI panel information vector, or an IBI/interference panel information vector) may be a bit vector including L elements, where L is an integer. These (L−1) elements of the interference panel indicator information are associated with actual UE receive antenna panel identifiers (IDs) for the beam associated with the TCI state. The L-th element indicates whether the entire interference panel indicator information is active or inactive (e.g., whether the interference panel information and/or the interference panel indication information should be taken into account at the UE). More detailed examples of the interference resource indicator information and the interference panel indicator information will be discussed below with regard to FIGS. 5 and 9.

Interference measurement resources interfering with transmissions on a given beam may be dedicated resources or common resources. Dedicated interference measurement resources may include ZP-CSI-IM or NZP-CSI-RS resources, or set(s) of resources. Common interference measurement resources may include resources associated with a SSB (e.g., a secondary synchronization signal, DMRS of PBCH, mobility CSI-RS resources, etc.).

In systems operating with spatial domain transmit or receive beams, the interference resource indicator information is associated with interfering resources of intra- and/or inter-cell-IBI irrespective of carrier frequency. In this regard, in addition to the QCL-TypeE parameter, TCI state specific configured interference resources share the same reference QCL-TypeD resource as the target RS in the activated TCI state.

When a system is not operating with beams, and QCL-TypeD is not applicable, the interference resource indicator information) may be used to indicate interfering resources causing intra- and/or inter-cell-IBI. In this case, TCI state specific interference resources share the same reference QCL-TypeA resource as the activated TCI state.

In at least one example embodiment, the gNB may initialize and overwrite values of elements of the interference resource indicator information with new values (e.g., indicating different active/inactive interference measurement resources) dynamically. The interference resource indicator information for one or more TCI states may be adapted and sent via physical layer DCI-based signaling.

With regard to physical layer DCI-based signaling, in one example, the interference resource indicator information may be implemented as a TCI state specific DCI message (e.g., having a length of K bits) to set one or more of the K elements of the interference resource indicator information (e.g., change the value of one or more elements of the bit vector from inactive (e.g., '0') to active (e.g., '1') or vice versa).

The gNB may also initialize and/or overwrite the interference resource information associated with the interference resource indicator information. For example, the gNB may initialize and/or overwrite functions for interference resources associated with the interference resource indicator information. The initializing and overwriting of the interference resource information may be done via RRC-level, MAC-level signaling.

With regard to MAC-level based signaling, a TCI state specific MAC CE may initialize or overwrite one or more elements of the interference resource information.

With regard to RRC-level based signaling, a TCI state specific RRC signaling may initialize or overwrite one or more elements of the interference resource information.

Similarly, in at least one example embodiment, the gNB may initialize and overwrite values of elements of the interference panel indicator information with new values (identifying different active UE receive antenna panel IDs) dynamically. The interference panel indicator information for one or more TCI states may also be adapted and sent via physical layer DCI-based signaling.

With regard to physical layer DCI-based signaling, in one example, a TCI state specific DCI message (e.g., having a length of L bits) may be used to set one or more of the L elements of the interference panel indicator information (e.g., change the value of one or more elements of the interference panel indicator information from inactive (e.g., '0') to active (e.g., '1') or vice versa).

The gNB may also initialize and/or overwrite the interference panel information associated with the interference panel indicator information. For example, the gNB may initialize and/or overwrite functions for interference panel information associated with the interference panel indicator information. The initializing and overwriting of the interference panel information may be done via RRC-level, MAC-level signaling.

With regard to MAC-level based signaling, a TCI state specific MAC CE may initialize or overwrite one or more elements of the interference panel information.

With regard to RRC-level based signaling, a TCI state specific RRC signaling may initialize or overwrite one or more elements of the interference panel information.

Figure 5:
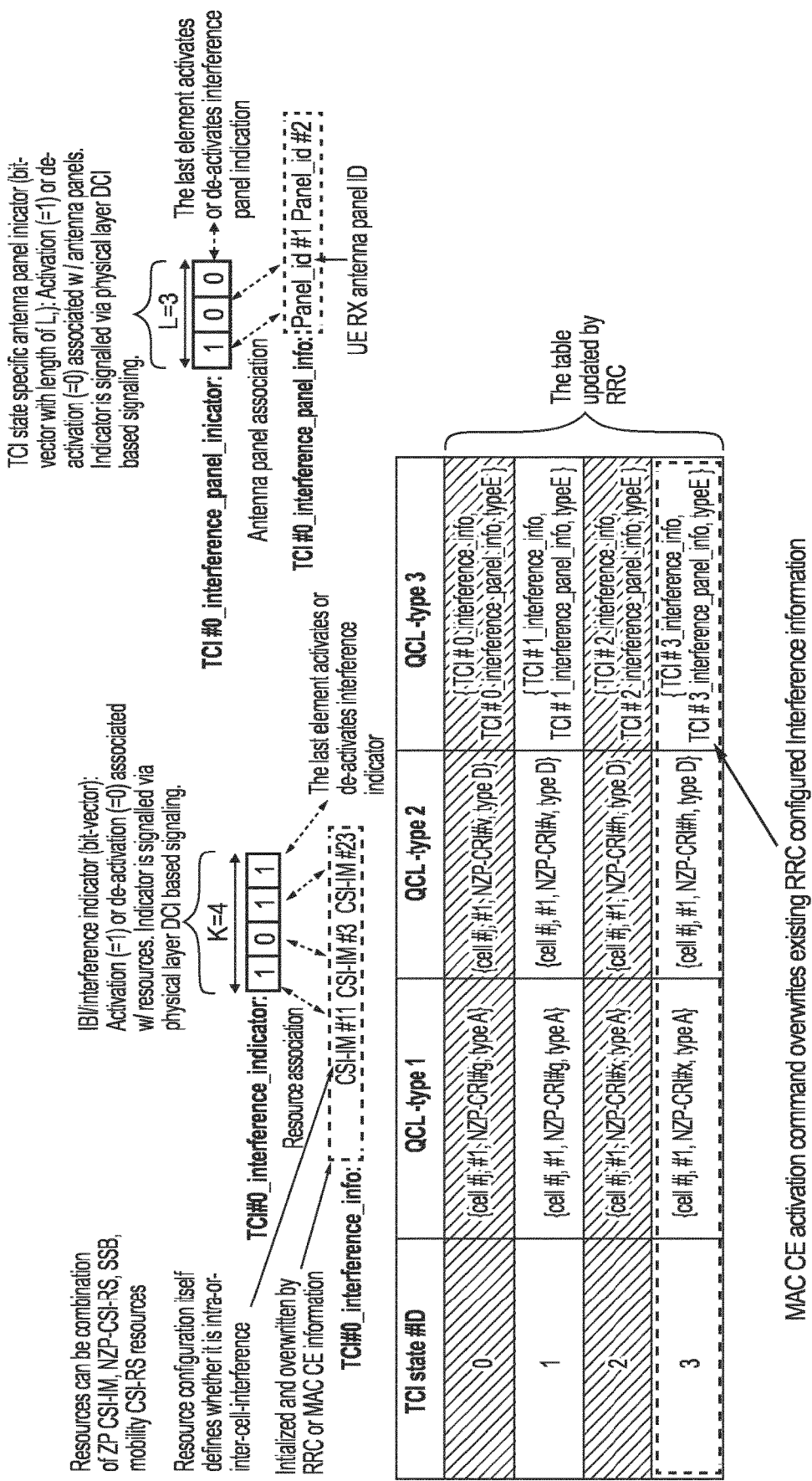
FIG. 5 illustrates an example of an interference indication mechanism according to example embodiments.

FIG. 5 illustrates examples of a beam specific IBI/interference indication mechanism according to example embodiments. The example IBI/interference indication mechanisms shown in FIG. 5 may be utilized together or separately.

The interference resource indicator information (TCI #m_interference_indicator, where m is an integer corresponding to the TCI state #ID) in FIG. 5 includes K=4 elements [$k_0$, $k_1$, $k_2$, $k_3$], wherein $k_0$=1, $k_1$=0, $k_2$=1 and $k_3$=1 (i.e., [1, 0, 1, 1]). Each of elements $k_0$, $k_1$, $k_2$ of the interference resource indicator information are used to indicate whether a respective interference measurement resource (TCI #m_interference_info in FIG. 5) is active for a given transmit beam associated with the given TCI state by setting the value of the element to '1'. In this example, the first element $k_0$ indicates that CSI-IM #11 is an active interference measurement resource with regard to the given beam, the second element $k_1$ indicates that CSI-IM #3 is an inactive interference measurement resource with regard to the given beam, and the third element $k_2$ indicates that CSI-IM #23 is an active interference measurement resource with regard to the given beam.

According one or more example embodiments, the interference measurement resources identified in the QCL-TypeE parameter may be mapped to elements of the interference resource indicator information and/or dedicated RRC signaling may be used to establish an association between elements of the interference resource indicator information and interference measurement resources.

The value of the K-th element $k_3$ of the interference resource indicator information causes the UE to activate or deactivate the entire interference resource indicator information. For example, setting the value of element $k_3$ to '0' causes the UE to deactivate the interference resource indicator information, whereas the setting the value of element $k_3$ to '1' causes the UE to activate the interference resource indicator information. In this regard, the K-th element $k_3$ indicates whether the UE should take into account the interference resource indicator information and/or interference resource information when determining an advanced receiver and/or receive spatial filter for antenna panels at the UE.

The interference panel indicator information (TCI #m_interference_panel_indicator, where m is an integer corresponding to the TCI state #ID) in FIG. 5 includes L=3 elements $[l_0, l_1, l_2]$, wherein $l_0=1$, $l_1=0$, and $l_2=0$ (i.e., [1, 0, 0]). Each of elements $l_0$ and $l_1$ of the interference panel indicator information are used to indicate a respective antenna panel (TCI #m_interference_panel_info in FIG. 5) to be active for a given transmit beam associated with the given TCI state by setting the value of the element to '1'. In this example, the first element $l_0$ is associated with Panel_ID #1 and the second element $l_1$ is associated with Panel_ID #2 at the UE. In this example, the interference panel indicator information indicates that antenna panel Panel_ID #1 should be the receive antenna panel at the UE.

According one or more example embodiments, the antenna panels may be mapped to elements of the interference panel indicator information and/or dedicated RRC signaling may be used to establish an association between elements of the interference panel indicator information and antenna panels.

The value of the L-th element $l_2$ of the interference panel indicator information causes the UE to activate or deactivate the entire interference panel indicator information. For example, setting the value of element $l_2$ to '0' causes the UE to deactivate the interference panel indicator information, whereas the setting the value of element $l_2$ to '1' causes the UE to activate the interference panel indicator information. In this regard, the L-th element $l_2$ indicates whether the UE should take into account the interference panel indicator information and/or the interference panel information.

Still referring to FIG. 5, the QCL-TypeE parameter (e.g., TCI #0_interference_info, TCI #0_interference_panel_info, TCI #1_interference_info, TCI #1_interference_panel_info, TCI #2_interference_info, TCI #2_interference_panel_info, TCI #3_interference_info, TCI #3_interference_panel_info) for a respective TCI state is included as the QCL-type 3 entry in the table of TCI states. The QCL-type 3 entry also indicates that the information included as the QCL-type 3 entry is a QCL-TypeE parameter.

As discussed above, the interference resource indicator information, the interference resource information, the interference panel indicator information and/or interference panel information may be separately adapted (initialized and/or overwritten) dynamically by RRC, MAC CE or DCI based signaling.

Based on the IBI indication mechanism framework according to example embodiments, when single or multiple TCI states have been activated by the gNB, the UE is aware of the IBI for a specific downlink transmit beam associated with the PDCCH, PDSCH, NZP-CSI-RS, etc., by virtue of the interference indicator information and QCL-TypeE parameter included as the QCL-type 3 entry for a given TCI state. As a result, the UE may activate and/or deactivate UE receive antenna panels for simultaneous interference mitigation over activated antenna panels according to the interference indicator information and QCL-TypeE parameter(s). Furthermore, the UE may determine spatial filter(s) associated with UE receive antenna panels, which may improve the performance of UE advanced receiver with CSI of interferers obtained from indicated interference resources taking into account the intra- or inter-cell-IBI/interference information for the reception of the downlink transmit beam.

According to one or more example embodiments, if the interference resource indicator information is not signaled (e.g., the UE does not receive the interference resource indicator information via signaling, such as DCI signaling), then the UE may use all interference measurement resources defined in the interference resource information included in the QCL-TypeE parameter per TCI defined state as 'active' interferers with regard to a given beam.

According to one or more example embodiments, if the interference panel indicator information is not signaled (e.g., the UE does not receive the interference panel indicator information via signaling, such as DCI signaling), then the UE may use all interference panel IDs defined in the interference panel information in the QCL-TypeE parameter per TCI defined state as 'active' UE receive antenna panel with regard to a given beam.

Example modifications with regard to the 3GPP NR Rel-15 TCI-state definition in TS 38.331 to enable dynamic joint downlink transmit beam and intra-cell and/or inter-cell IBI/interference aware UE receiver, configuration indication for CORESET and/or DMRS of PDSCH and/or NZP-CSI-RS are shown below. The changes relative to the 3GPP NR Rel-15 standard are underlined.

```
TCI-State ::=              SEQUENCE {
  tci-StateId              TCI-StateId,
  qcl-Type1                QCL-Info,
  qcl-Type2                QCL-Info        OPTIONAL, --
Need R
  qcl-Type3                QCL-Info        OPTIONAL, --

Need R
  },
  ...
}
  QCL-Info ::=             SEQUENCE {
  cell                     ServCellIndex
       OPTIONAL, -- Need R
  bwp-Id                   BWP-
Id                                         OPTIONAL, -- Cond CSI-RS-
Indicated
  referenceSignal          CHOICE {
    csi-rs                 NZP-CSI-RS-ResourceId
    ssb                    SSB-Index
  }
  Interference-info        SEQUENCE{CSI-IM-ResourceId, NZP-
CSI-RS-ResourceId,SSB-Index,CSI-RS-Index (CSI-RS-Mobility)

Interference-panel-info  SEQUENCE{UE RX panel IDs}
  }
,
  qcl-Type                 ENUMERATED {typeA, typeB, typeC, typeD,
typeE},
  ...
}
```

Figure 9:
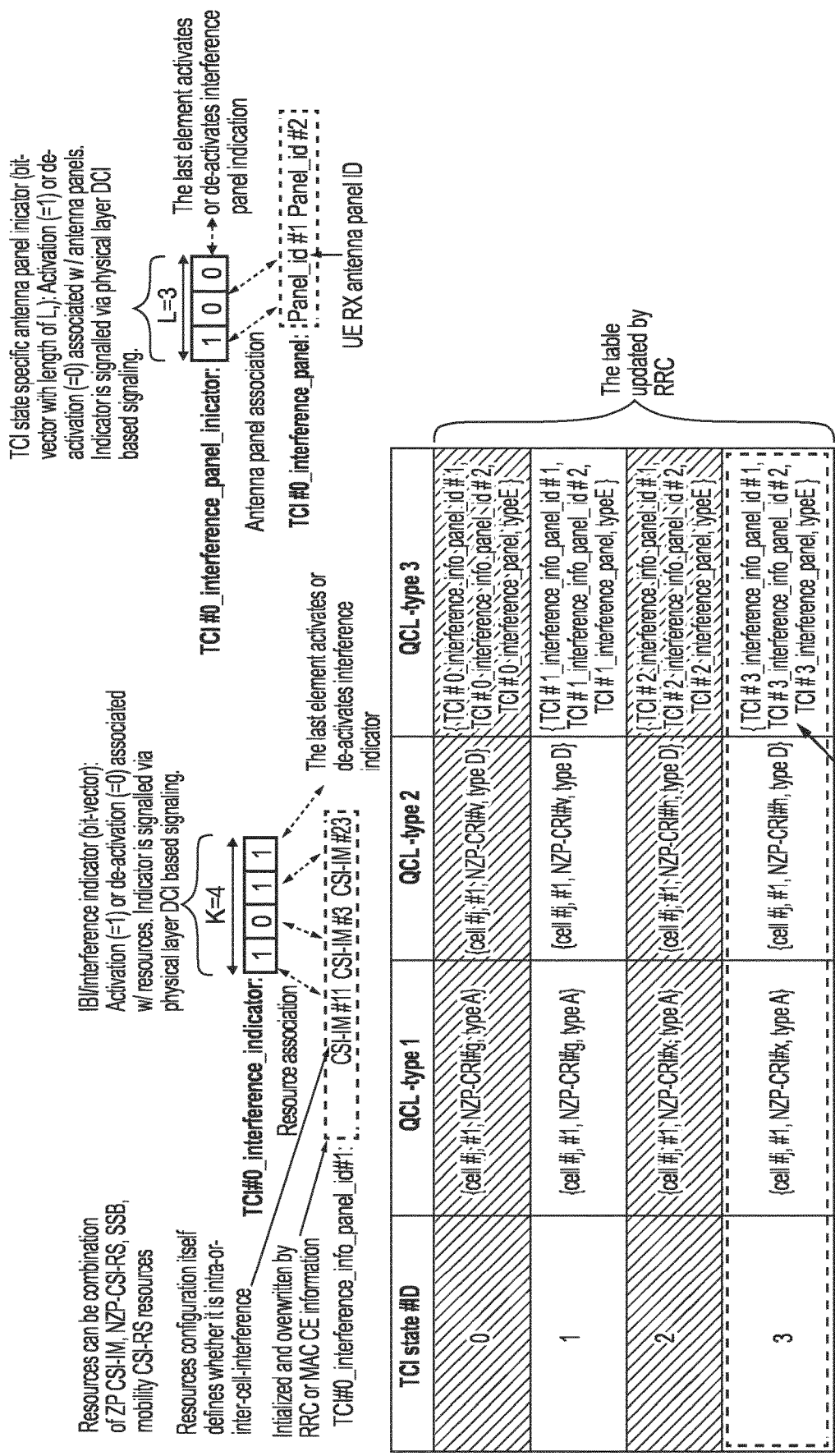
FIG. 9 illustrates another example of an interference indication mechanism according to example embodiments.

FIG. 9 illustrates another example beam specific interference indication mechanism according to example embodiments.

The example embodiment shown in FIG. 9 is similar to the example embodiment shown in FIG. 5, except that a plurality of interference resource information parameters (TCI #m_interference_info_panel_ID #n, where m is the TCI ID and n is the Panel ID) are included per TCI state. According to at least this example embodiment, interference resource information for each UE receive antenna panel may be included, and thus, each antenna panel may have its own specific interference resources.

In at least this example embodiment, the UE may have a more interference aware and/or enhanced receiver, and thus, system performance may be further improved.

Example methods for configuration and utilization of the above-discussed IBI/interference indication mechanism framework in a 3GPP NR access deployment will now be discussed with regard to FIGS. 1, 5, 6 and 7.

Figure 6:
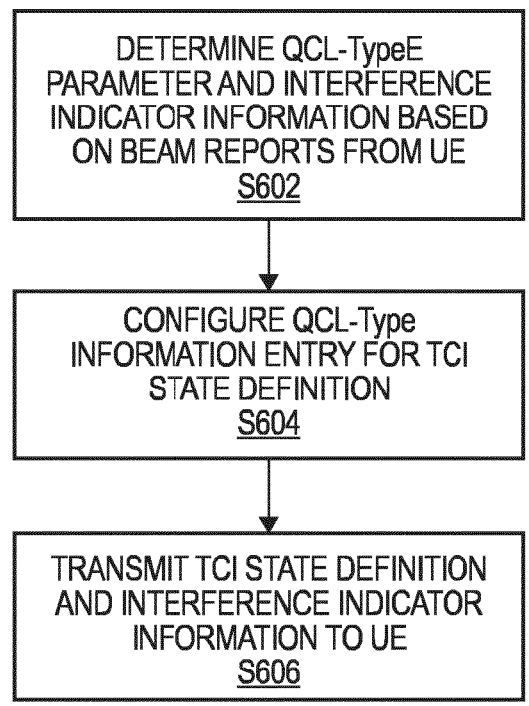
FIG. 6 is a flow chart illustrating a method according to example embodiments.

FIG. 6 is a flow chart illustrating a method according to one or more example embodiments. The method shown in FIG. 6 will be discussed with regard to the 3GPP NR access deployment shown in FIG. 1. For clarity, the example embodiment shown in FIG. 6 will be discussed with regard to the QCL-type entries for the downlink transmit beam associated with TCI state #ID 3 and the example table shown in FIG. 5. It should be understood, however, that similar or the same methodology may apply with regard to the example embodiment shown in FIG. 9. The method shown in FIG. 6 may be performed at the gNB 102 and may utilize the downlink transmit beam specific intra-cell and/or inter-cell IBI/interference indication mechanisms discussed above.

Referring to FIGS. 1, 5 and 6, at step S602 the gNB 102 determines and/or generates the QCL-TypeE parameter and interference indicator information (e.g., including interference panel indicator information and interference resource indicator information) for the beam (also referred to herein as a transmission beam, transmit beam, downlink beam, receive beam, etc.) associated with TCI state #ID=3 between the gNB 102 and the UE 106 based on at least one beam report for the beam from the UE 106. As discussed above, the at least one beam report may include at least one transmission characteristic for the beam such as at least one of a RSRP value, a CRI, SSB indices, SINR values, group ID associated with UE antenna panels, and/or RSRP values associated with interference resources. Based on obtained UE beam reports, the gNB 102 initializes and/or overwrites QCL-TypeE parameters by RRC and/or MAC CE based signaling.

Also at step S602, the gNB 102 configures the interference indicator information (e.g., including the interference resource indicator information and/or the interference panel indicator information) for the TCI state to provide dynamic inter-beam-interference situation for the UE 106. The gNB 102 may configure the interference indicator information using DCI-based signaling as discussed above.

Since the network (e.g., the gNB 102) has configured specific dedicated interference measurement resources for L1-SINR interference measurements, based on UE beam reports including, for example, L1-RSRP values and group ID information, the network has interference awareness at the UE antenna panel-level for downlink transmit beams. Based on this information, the network may determine intra- and/or inter-cell IBI situation(s) at the UE 106 for downlink transmit beams (e.g., TCI state specific) when scheduling simultaneous multi-beam transmissions from a single or multi-TRPs.

At step S604, the gNB 102 enters (or configures) the QCL-TypeE parameter determined at step S602 into the table as the QCL-type 3 entry (QCL-type information entry) for the beam associated with TCI state #ID=3. That is, for example, the gNB 102 configures the QCL-type information entry in the TCI state definition with the QCL-TypeE parameter.

At step S606, the gNB 102 transmits the TCI state definition to the UE 106. The gNB 102 may transmit the TCI state definition to the UE 106 as part of the downlink scheduling assignment for the UE 106. Also at step S606, the gNB 102 provides the interference indicator information (bit vector(s)) as part of the DCI along with the downlink grant for the UE 106. The downlink grant may be based on existing downlink grants, or may be a dedicated downlink grant for this purpose and cover single or multiple TCI state specific interference indicator information.

Figure 7:
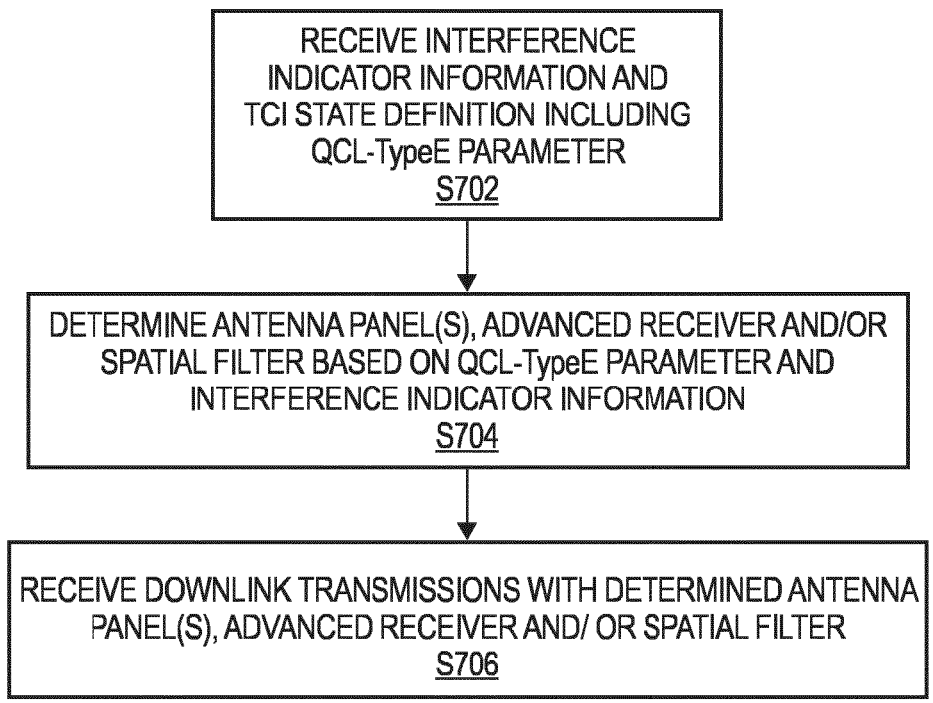
FIG. 7 is a flow chart illustrating another method according to example embodiments.

FIG. 7 is a flow chart illustrating a method according to one or more example embodiments. As with the example embodiment shown in FIG. 6, the method shown in FIG. 7 will be discussed with regard to the 3GPP NR access deployment shown in FIG. 1. Moreover, the example embodiment shown in FIG. 7 will also be discussed with regard to the QCL-type entries for the downlink transmit beam associated with TCI state #ID 3 and the example table shown in FIG. 5. It should be understood, however, that similar or the same methodology may apply with regard to the example embodiment shown in FIG. 9. The method shown in FIG. 7 may be performed at the UE 106.

Referring to FIGS. 1, 5 and 7, at step S702 the UE 106 receives the interference indicator information and TCI state definition for the transmission beam associated with TCI state #ID 3 from the gNB 102. The TCI state definition includes, among other things, the QCL-TypeE parameter determined at step S602 in FIG. 6.

At step S704, the UE 106 determines, among other things, the downlink advanced receiver and/or receive spatial filter associated with one or more (e.g., a plurality of) antennas (or antenna panels) at the UE 106 based on at least the interference indicator information and the QCL-TypeE parameter included as the QCL-type 3 entry in the TCI state #ID 3 received at the UE 106. As discussed above, in one example, the UE 106 may compute (e.g., explicitly) an estimate of an interference covariance matrix according to the interfering resources (in the interference resource information) that are indicated as active in the interference resource indicator information from the gNB 102 for the use of an advanced receiver. In another example, the UE 106 may use the interference resource information from the gNB 102 to define dominant intra-cell or inter-cell interferers for interference cancellation at the advanced receiver at the UE 106.

Additionally, the UE 106 may activate and/or deactivate UE receive antenna panels for simultaneous interference mitigation over activated antenna panels according to the interference panel indicator information and the interference panel information included in the QCL-TypeE parameter from the gNB 102.

By taking into account the TCI state specific QCL-TypeE parameter and associated interference indicator information in determining the advanced receiver and/or receive spatial filter at step S704, the determined advanced receiver and/or receive spatial filter at the UE 106 is an IBI-aware advanced receiver and/or receive spatial filter.

At step S706, the UE 106 receives downlink transmissions from the gNB 102 (e.g., via TRP 102A, 102B, 102C, etc.) with the advanced receiver and/or receive spatial filter determined at step S704. In at least one example, the UE 106 receives PDCCH transmissions with related DMRS and/or PDSCH transmissions with related DMRS or NZP-CSI-RS with the advanced receiver and/or receive spatial filter determined at step S704.

Figure 8:
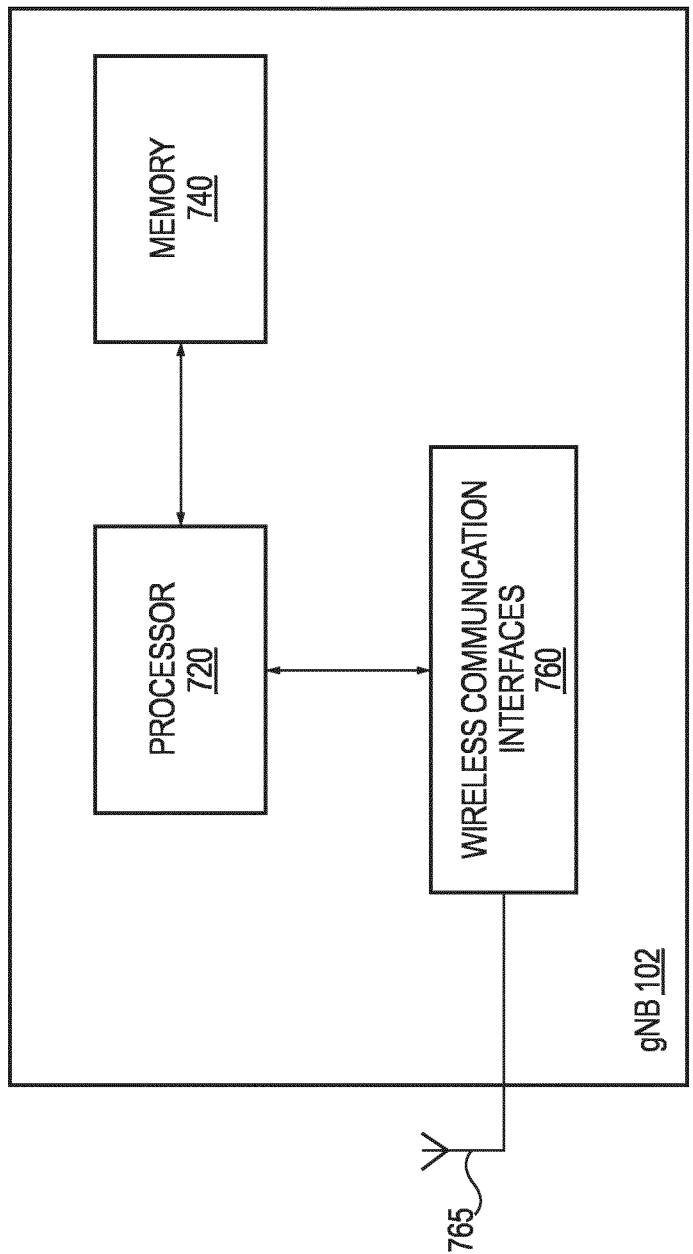
FIG. 8 is a block diagram illustrating an example embodiment of a gNB.

FIG. 8 illustrates an example embodiment of the gNB 102 shown in FIG. 1.

As shown, the gNB 102 includes: a memory 740; a processor 720 connected to the memory 740; various interfaces 760 connected to the processor 720; and one or more antennas or antenna panels 765 connected to the various interfaces 760. The various interfaces 760 and the antenna 765 may constitute a transceiver for transmitting/receiving data from/to the gNB 102 via a plurality of wireless beams or from/to the plurality of TRPs 102A, 102B, 102C, etc. As will be appreciated, depending on the implementation of the gNB 102, the gNB 102 may include many more components than those shown in FIG. 8. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the gNB 102 (e.g., functionalities of a gNB, methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the gNB 102 will vary depending on the implementation of the gNB 102.

The interfaces 760 may also include one or more user input devices (e.g., a keyboard, a keypad, a mouse, or the like) and user output devices (e.g., a display, a speaker, or the like).

Although not specifically discussed herein, the configuration shown in FIG. 8 may be utilized to implement, inter alia, the TRPs 102A, 102B, 102C, the UE 106, other radio access and backhaul network elements and/or devices. In this regard, for example, the memory 740 may store an operating system and any other routines/modules/applications for providing the functionalities of the TRPs, UE, etc. (e.g., functionalities of these elements, methods according to the example embodiments, etc.) to be executed by the processor 720.

As discussed above, IBI/interference awareness at the network-side or the UE-side may be beneficial in enhancing the scheduling flexibility of simultaneous multi-beam and multi-TRP transmission in NR Rel-16 and beyond. To enable the flexible use of IBI/interference awareness, one or more example embodiments address issues associated with UE antenna panel specific IBI measurement with UE advanced receiver and/or receive beam/spatial filter alignment (e.g., through the use of the additional QCL-TypeE parameter discussed herein).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A radio network element comprising:
   at least one processor; and
   at least one memory including computer program code, the at least one memory and the computer program code configured to, with the at least one processor, cause the radio network element to
      configure a quasi-co-location-type information entry included in a transmission configuration indication state for a downlink transmission beam between the radio network element and a user equipment based on at least one beam report, the at least one beam report including at least one transmission parameter for the downlink transmission beam, and the quasi-co-location-type information entry being indicative of one or more sources of inter-beam-interference on the downlink transmission beam at the user equipment, and
      transmit the transmission configuration indication state including the quasi-co-location-type information entry to the user equipment;
   wherein the at least one memory and the computer program code are configured to, with the at least one processor, cause the radio network element to configure interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

2. The radio network element according to claim 1, wherein the interference resource indicator information includes a second element indicating whether the interference resource indicator information is active or inactive for the downlink transmission beam.

3. The radio network element according to claim 1, wherein the quasi-co-location-type information entry identifies at least one of an antenna panel at the user equipment or at least one interference resource with respect to the downlink transmission beam.

4. A user equipment comprising:
at least one antenna;
at least one processor; and
at least one memory including computer program code, the at least one memory and the computer program code configured to, with the at least one processor, cause the user equipment to
determine at least one of a downlink advanced receiver or spatial filter for the at least one antenna based on a quasi-co-location-type information entry included in a transmission configuration indication state received at the user equipment, the quasi-co-location-type information entry configured based on at least one beam report from the user equipment, the at least one beam report including at least one transmission parameter for a downlink transmission beam between a radio network element and the user equipment, and the quasi-co-location-type information entry being indicative of one or more sources of inter-beam-interference on the downlink transmission beam at the user equipment;
wherein the at least one memory and the computer program code are configured to, with the at least one processor, cause the user equipment to determine the at least one of the downlink advanced receiver or the spatial filter for the at least one antenna based on the quasi-co-location-type information entry and interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

5. The user equipment according to claim 4, wherein the interference resource indicator information includes a second element indicating whether the interference resource indicator information is active or inactive for the downlink transmission beam.

6. The user equipment according to claim 4, wherein the quasi-co-location-type information entry identifies at least one of an antenna panel at the user equipment or at least one interference resource with respect to the downlink transmission beam.

7. The user equipment according to claim 4, wherein the one or more sources of inter-beam-interference include at least one of zero-power Channel State Information Interference Measurement, non-zero-power Channel State Information Reference Signal, Synchronization Signal Block index, Demodulation Reference Signals, Phase Tracking Reference Signals or mobility Channel State Information Resource Signal resources.

8. The user equipment according to claim 4, wherein the quasi-co-location-type information entry is indicative of an inter-beam-interference relationship between a target signal and a reference signal at the user equipment.

9. The user equipment according to claim 4, wherein the inter-beam-interference includes intra-cell-inter-beam-interference or inter-cell-inter-beam-interference.

10. The user equipment according to claim 4, wherein
the at least one transmission parameter includes at least one of a Reference Signal Received Power value, a Channel State Information Resource Indicator, Synchronization Signal Block indices, Signal-to-Interference and Noise Ratio values, Reference Signal Received Power value associated with interference resources, or a group ID associated with antenna panels at the user equipment; and
the at least one memory and the computer program code are configured to, with the at least one processor, cause the user equipment to transmit the at least one beam report to the radio network element.

11. The user equipment according to claim 6, wherein the at least one memory and the computer program code are configured to, with the at least one processor, cause the user equipment to determine whether to utilize the antenna panel based on interference panel indicator information, the interference panel indicator information including at least a first element indicating whether to utilize the antenna panel for the downlink transmission beam at the user equipment.

12. The user equipment according to claim 11, wherein the interference panel indicator information includes a second element indicating whether the interference panel indicator information is active or inactive for the downlink transmission beam.

13. A method for configuring a user equipment including at least one antenna for wireless communication, the method comprising:
determining at least one of a downlink advanced receiver or spatial filter for the at least one antenna based on a quasi-co-location-type information entry included in a transmission configuration indication state received at the user equipment, the quasi-co-location-type information entry configured based on at least one beam report generated at the user equipment, the at least one beam report including at least one transmission parameter for a downlink transmission beam between a radio network element and the user equipment, and the quasi-co-location-type information entry being indicative of one or more sources of inter-beam-interference on the downlink transmission beam at the user equipment, wherein
the determining determines the at least one of the downlink advanced receiver or the spatial filter for the at least one antenna based on the quasi-co-location-type information entry and interference resource indicator information associated with the quasi-co-location-type information entry, the interference resource indicator information including a plurality of first elements, each of the plurality of first elements indicating whether a respective source of inter-beam-interference is active or inactive as an interference resource with respect to the downlink transmission beam.

14. The method according to claim 13, wherein the interference resource indicator information includes a second element indicating whether the interference resource indicator information is active or inactive for the downlink transmission beam.

15. The method according to claim 13, wherein
the at least one transmission parameter includes at least one of a Reference Signal Received Power value, a Channel State Information Resource Indicator, Synchronization Signal Block indices, Signal-to-Interference and Noise Ratio values, Reference Signal Received Power value associated with interference resources, or a group ID associated with antenna panels at the user equipment; and
the method further includes transmitting the at least one beam report to the radio network element.

16. The method according to claim 13, further comprising:
    receiving downlink transmissions from the radio network element by utilizing the at least one of the downlink advanced receiver or the spatial filter for the at least one antenna.

17. The method according to claim 13, further comprising:
    determining whether to utilize an antenna panel based on interference panel indicator information, the interference panel indicator information including at least a first element indicating whether to utilize the antenna panel for the downlink transmission beam at the user equipment.

\* \* \* \* \*